(12) United States Patent
Bailly et al.

(10) Patent No.: US 10,868,780 B2
(45) Date of Patent: Dec. 15, 2020

(54) METHOD OF NOTIFYING A SENDER OF AN INABILITY TO DELIVER A MESSAGE TO AN UNREACHABLE TERMINAL

(71) Applicant: ORANGE, Paris (FR)

(72) Inventors: Marc Bailly, Trebeurden (FR); Jean-Claude Le Rouzic, Trebeurden (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/089,721

(22) PCT Filed: Mar. 24, 2017

(86) PCT No.: PCT/FR2017/050692
§ 371 (c)(1),
(2) Date: Sep. 28, 2018

(87) PCT Pub. No.: WO2017/168078
PCT Pub. Date: Oct. 5, 2017

(65) Prior Publication Data
US 2019/0116140 A1 Apr. 18, 2019

(30) Foreign Application Priority Data
Mar. 31, 2016 (FR) ...................................... 16 52802

(51) Int. Cl.
*G06F 15/16* (2006.01)
*H04L 12/58* (2006.01)
(Continued)

(52) U.S. Cl.
CPC ............ *H04L 51/043* (2013.01); *H04L 51/38* (2013.01); *H04L 65/1006* (2013.01);
(Continued)

(58) Field of Classification Search
CPC ............... H04L 51/043; H04L 65/1016; H04L 65/1006; H04L 51/38; H04L 51/30;
(Continued)

(56) References Cited

U.S. PATENT DOCUMENTS 10,044,777 B2    8/2018 Beaufils et al.
2004/0199649 A1*  10/2004 Tarnanen ................ H04L 29/06
                                                        709/230
(Continued)

FOREIGN PATENT DOCUMENTS

EP    2160051 A1 *  3/2010  ............. H04L 51/04
FR    3011412 A1    4/2015

OTHER PUBLICATIONS

Klyne et al. "Common Presence and Instant Messaging (CPIM): Message Format." Network Working Group, Request for Comments: 3862. Aug. 2004.

(Continued)

*Primary Examiner* — Johnny B Aguiar
(74) *Attorney, Agent, or Firm* — David D. Brush; Westman, Champlin & Koehler, P.A.

(57) ABSTRACT

A method of notification by an application server of an inability to deliver a message sent by a first terminal destined for a second terminal. The message is transmitted from the first terminal to the second terminal by way of the application server. The application server is configured to store at least one message with a view to a subsequent retransmission when the recipient is not reachable. The method includes: obtaining a message intended for the second terminal, detecting that the second terminal is not reachable, determining an identifier of the sender of the message obtained and of the identifier of the message obtained, and transmitting a notification message to the sender of the message. The message includes at least the identifier of the (Continued)

Figure 1:
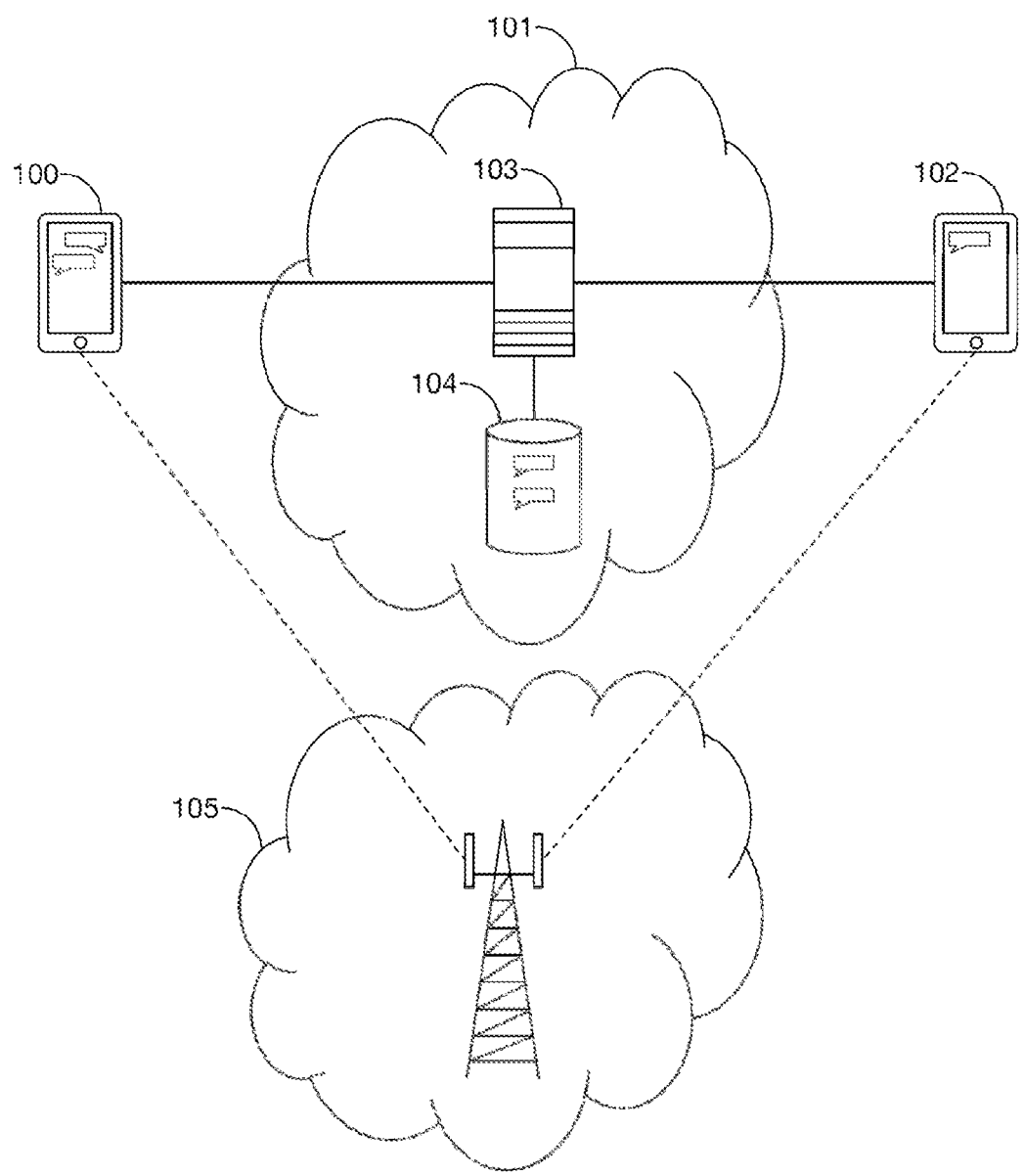

message obtained and an indication according to which the message obtained has not been delivered.

10 Claims, 5 Drawing Sheets

(51) Int. Cl.
*H04L 29/06* (2006.01)
*H04W 4/14* (2009.01)
*H04W 4/12* (2009.01)

(52) U.S. Cl.
CPC ........... *H04L 65/1016* (2013.01); *H04W 4/14* (2013.01); *H04L 29/06197* (2013.01); *H04L 29/06204* (2013.01); *H04L 51/30* (2013.01); *H04L 51/34* (2013.01); *H04W 4/12* (2013.01)

(58) Field of Classification Search
CPC .............. H04L 51/34; H04L 29/06197; H04L 29/06204; H04W 4/14; H04W 4/12
USPC ................ 709/206, 207, 224, 227, 238, 239
See application file for complete search history.

(56) References Cited

U.S. PATENT DOCUMENTS

| | | | | |
|---|---|---|---|---|
| 2008/0228892 | A1* | 9/2008 | Staack | H04L 51/14 709/206 |
| 2009/0176517 | A1* | 7/2009 | Christie | H04L 51/30 455/466 |
| 2009/0197622 | A1 | 8/2009 | Atarius | |
| 2010/0205539 | A1* | 8/2010 | Gestsson | G06Q 10/107 715/752 |
| 2011/0060800 | A1* | 3/2011 | Cohen | G06Q 10/107 709/206 |
| 2011/0072099 | A1* | 3/2011 | Harju | H04L 51/066 709/206 |
| 2014/0105107 | A1 | 4/2014 | Vaananen | |
| 2014/0122956 | A1* | 5/2014 | Yun | H04L 1/1887 714/748 |
| 2014/0173002 | A1* | 6/2014 | Frederick | H04W 12/06 709/206 |
| 2017/0109013 | A1* | 4/2017 | Hong | G06F 3/04817 |

OTHER PUBLICATIONS

International Search Report dated May 18, 2017, for corresponding International Application No. PCT/FR2017/050692, filed Mar. 24, 2017.
Written Opinion of the International Searching Authority dated May 18, 2017, for corresponding International Application No. PCT/FR2017/050692, filed Mar. 24, 2017.
English translation of the International Written Opinion of the International Searching Authority dated May 30, 2017, for corresponding International Application No. PCT/FR2017/050692, filed Mar. 24, 2017.
French Search Report dated Dec. 15, 2016, for corresponding French Application No. 1652802, filed Mar. 31, 2016.
French Written Opinion dated Dec. 15, 2016, for corresponding French Application No. 1652802, filed Mar. 31, 2016.

* cited by examiner

METHOD OF NOTIFYING A SENDER OF AN INABILITY TO DELIVER A MESSAGE TO AN UNREACHABLE TERMINAL

CROSS-REFERENCE TO RELATED APPLICATIONS

This Application is a Section 371 National Stage Application of International Application No. PCT/FR2017050692, filed Mar. 24, 2017, the content of which is incorporated herein by reference in its entirety, and published as WO 2017/168078 on Oct. 5, 2017, not in English.

FIELD OF THE DISCLOSURE

The invention belongs to the field of telecommunications and relates in particular to the field of instant messaging.

BACKGROUND OF THE DISCLOSURE

Mobile terminals offer their users the possibility of exchanging messages according to various modalities. For example, they can send and receive SMSs (Short Message Service) or else MMSs (Multimedia Messaging Service). With the arrival of high-throughput mobile and the development of architecture of IMS type, new communication possibilities have appeared. Thus, telecommunication operators have defined a new standard for message exchange, based on the IP protocol (Internet Protocol). The RCS (Rich Communication Suite) standard is a communication service which improves user experience by exploiting the high-throughput Internet connection available on modem terminals. In particular, RCS makes it possible to exchange messages between various types of terminals using various types of network access (mobile, fixed, etc). Furthermore, RCS offers functions making it possible to ascertain the state of reception of a message by the recipient, to send and receive files of more considerable sizes than with MMS or else functions of deferred sending, called "Store & Forward", which make it possible to store a message temporarily in the network when it cannot be delivered to the recipient immediately. These functions intervene typically when the recipient's terminal is not connected or in case of loss of data connectivity of the receiving terminal. Terminals therefore offer two different technologies for conveying messages between users. The RCS specifications have made provision to favor the use of the IP connection since it is more reactive and permits more advanced services, but the possibility of using conventional messaging protocols (SMS, MMS) remains when the recipient is not reachable through the IP connection.

In the RCS European profile (Joyn), the choice between sending a message according to the RCS protocol or the SMS protocol is made according to the capabilities of the sender terminal and recipient terminal at the moment when the message composed by the user needs to be sent. By way of example, if the sender's terminal identifies that the recipient supports the RCS service and that they both have IP (Internet Protocol) connectivity, then it will choose to dispatch a message via RCS. On the other hand if it detects that the recipient terminal does not have IP connectivity or that it does not support the RCS service, the message will be sent via an SMS.

When both terminals support the RCS service and a connection has been established for message exchange, a message acknowledgment mechanism makes it possible to know immediately whether a sent message has indeed been received and displayed on the opposite party's terminal.

The "Store & Forward" function relies generally on this acknowledgment mechanism to know whether or not it is necessary to store a message. The absence of receipt of an acknowledgment will in fact prompt storage of the message for a later re-delivery attempt.

It is also on this absence of receipt of the acknowledgment that the sender terminal's mechanism of fallback to SMS relies. Indeed, a certain interval having passed after the sending of the message and in the absence of receipt of the notification of delivery of the message of the recipient terminal, the sender terminal retransmits the message in SMS. The waiting interval before retransmission via SMS is configurable by the operator.

This mode of operation makes it possible to guarantee distribution of the message, but it exhibits drawbacks.

A first drawback is related to the duplication of the dispatched messages. Indeed, when a message is re-sent in the form of an SMS via the terminal's IP connection, the same message travels over the operator network twice, thus giving rise to an additional load for this network. Moreover, in certain circumstances, the message may be received as two copies by the recipient (one copy of the message is received via RCS on the data connection of the recipient terminal by virtue of the "Store & Forward" function, the other copy being received by SMS).

Another drawback resides in the latency that such a retransmission scheme introduces. Indeed, the interval between sending the message via RCS and its resending by SMS in case of failure of the first dispatch is prejudicial to interactivity. When this interval is short, the duplication of the messages is increased whilst when this interval is long, the interactivity of the conversation is degraded.

Finally the duplication of the messages can cause a desequencing of the messages received by the recipient. Indeed, the latter may receive one or more messages by SMS subsequent to a loss of its IP connectivity, and then when the latter is regained, may again receive all or part of these messages by RCS, by virtue of the "Store & Forward" function. The coherence of the discussion thread may be seriously affected thereby.

A need therefore exists for a solution for retransmission of messages on an alternative connection which does not exhibit the aforementioned drawbacks of the prior art.

SUMMARY OF THE INVENTION

For this purpose, the invention relates to a method of notification by an application server, of an inability to deliver a message sent by a first terminal destined for a second terminal, the message being transmitted from the first terminal to the second terminal by way of the application server, the application server furthermore being configured to store at least one message with a view to a later retransmission when the recipient is not reachable.

The method is noteworthy in that it comprises the following steps:
obtaining a message intended for the second terminal,
detecting the fact that the second terminal is not reachable,
determining an identifier of the sender of the message obtained and the identifier of the message obtained,
transmitting a notification message to the sender of the message, the message comprising at least:
the identifier of the message obtained, and an indication according to which the message obtained has not been delivered.

When an application server receives messages destined for an opposite party whilst the latter is not reachable, the messages are stored in a database of the server by the Store & Forward function. The method then proposes, when the unreachability of the recipient is detected and the message has been stored, to search for a stored message for this is recipient. When a message is obtained, the method proposes to determine the sender thereof as well as an identifier of the message. This information makes it possible to dispatch a notification to the sender so as to alert the terminal that messages have not been able to be delivered and are stored while waiting for the recipient to be reachable again. Thus, the method makes it possible to identify the terminals that have sent messages which are awaiting distribution of the unavailability of the respective recipients of these messages. In this manner, the terminals can immediately take a fallback decision to revert to another mode of transmission of the message, without waiting for the expiry of a timeout.

According to a particular embodiment, the method furthermore comprises, subsequent to the transmission of the notification message, a step of receiving a message comprising a command for canceling the dispatching of at least one stored message with a view to a later retransmission.

The method thus provides that the later dispatching of messages stored by the "Store & Forward" function can be canceled. For example, a terminal can dispatch, subsequent to the retransmission of a message by SMS, a command for revoking a stored message. Thus, the method makes it possible to prevent the messages from being received as duplicate copies when the recipient's terminal becomes available again.

According to a particular embodiment, the method is such that the notification message comprises an indication relating to a plurality of stored messages which are intended for the second terminal.

Thus, a single notification message makes it possible to inform a sender when several messages are stored waiting to be able to be distributed.

According to a particular embodiment, the message is transmitted from the first terminal to the second terminal in a data transfer session in compliance with a first communication protocol, said session being established according to a second signaling protocol, the method being such that the notification is transmitted in a message in compliance with the second signaling protocol.

The RCS standard provides that the exchanges of messages are carried out in a session established in compliance with the MSRP protocol (Message Session Relay Protocol). Still according to the RCS standard, such an MSRP session is established with the aid of the SIP signaling protocol. Under these conditions, the method provides that the notification is sent in a message in compliance with the SIP protocol. In this manner, the terminal can receive the notification even if the MSRP connection is no longer active, and make provisions as regards the retransmission of the message by SMS. Moreover, using an already established SIP connection makes it possible to avoid establishing a new connection dedicated to the dispatching of the message. Such a provision makes it possible to avoid needless consumption of resources.

According to a particular embodiment, the message is transmitted from the first terminal to the second terminal in a data transfer session in compliance with a first communication protocol, said session being established according to a second signaling protocol, the method being such that the notification is transmitted in a message in compliance with the first data transfer protocol.

The method provides that the notification is transmitted according to the MSRP protocol by using the session established for the dispatching of the messages. By this provision, the method makes it possible to optimize the transport of the notification by using an already established connection.

According to a particular embodiment, the method is such that the first communication protocol is the MSRP protocol and that the second signaling protocol is the SIP protocol.

These provisions render the invention particularly suitable for the retransmission of messages in a communication according to the RCS standard.

According to another aspect, the invention relates to a device for notifying an inability to deliver a message sent by a first terminal destined for a second terminal, the message being transmitted from the first terminal to the second terminal by way of the device, the notification device furthermore being configured to store at least one message with a view to a later retransmission when the recipient is not reachable, the device being such that it comprises the following modules:
  a module for obtaining a message intended for the second terminal,
  a module for detecting the fact that the second terminal is unreachable:
  a module for determining an identifier of the sender of the message obtained and the identifier of the message obtained,
  a communication module adapted to transmit a notification message to the sender of the message, the message comprising at least:
    the identifier of the message obtained, and
    an indication according to which the message obtained has not been delivered.

The invention further pertains to an application server comprising a notification device such as described hereinabove.

In a corresponding manner, the invention also relates to a method of retransmission on a terminal, of a message sent according to a first transmission mode adapted to transmit a message to a recipient by way of a communication network comprising an application server, the application server furthermore being configured to store at least one message with a view to a later retransmission when the recipient is not reachable.

The method is noteworthy in that it comprises the following steps:
  Dispatching a message to the recipient according to a first transmission mode,
  Receiving a notification message from a server, the message comprising at least:
    an identifier of a message sent previously, and
    an indication according to which the identified message has not been delivered,
  Retransmitting the message to the recipient according to a second transmission mode.

Subsequent to the dispatching of a message according to a first transmission mode, such as for example according to the RCS standard, the terminal receives a notification comprising an indication that a message has not been delivered because the opposite party was not reachable. On receipt of such a message, the terminal can immediately take the decision to retransmit the message according to an alternative mode of transmission, such as for example by SMS. In this manner, in contradistinction to the techniques of the prior art, the terminal does not have to wait for the expiry of a preconfigured retransmission interval. This provision makes it possible to increase interactivity when the recipient of messages is no longer available to receive the messages according to the first transmission mode.

According to a particular embodiment, the retransmission method is such that it is furthermore comprises a step of sending the server a command for canceling the dispatching to the second terminal of at least message identified in the notification received.

When the terminal takes the decision to retransmit a message according to another transmission mode, it can warn the application server thereof by instructing it not to transmit the stored messages when the recipient becomes reachable again according to the RCS standard. Thus, the method makes it possible to prevent the recipient from receiving the messages in duplicate and reduces the risk of desequencing.

According to a particular embodiment, the retransmission method is such that the second transmission mode is a transmission mode of SMS type.

The availability of the SMS service is greater than the availability of an Internet connection on a mobile. Thus, by proposing message dispatch by SMS as fallback solution the method makes it possible to ensure the forwarding of the message should the recipient be unavailable.

According to another aspect, the invention also relates to a device for retransmitting a message sent according to a first transmission mode adapted to transmit a message to a recipient by way of a communication network comprising an application server, the application server furthermore being configured to store at least one message with a view to a later retransmission when the recipient is not reachable, the device being such that it comprises:

A communication module adapted to send a message to the recipient according to a first transmission mode,
A communication module adapted to receive a notification message from an application server, the message comprising at least:
an identifier of a message sent previously, and
an indication according to which the identified message has not been delivered,
A communication module adapted to retransmit the message to the recipient according to a second transmission mode.

The invention further pertains to a terminal comprising a retransmission device such as described hereinabove.

The devices, server and terminals described previously exhibit advantages analogous to those of the methods to which they pertain.

In a particular embodiment, the various steps of the notification and retransmission methods are determined by instructions of computer programs.

Consequently, the invention also envisages a computer program comprising instructions suitable for the implementation of the steps of the hereinabove described methods, when the program is executed by a processor.

This program can use any programming language, and be in the form of source code, object code, or of code intermediate between source code and object code, such as in a partially compiled form, or in any other desirable form.

The invention also envisages a recording medium readable by a processor on which is recorded a computer program comprising instructions for the execution of the steps of the notification method and/or instructions for the execution of the steps of the retransmission method.

The information medium can be any entity or device capable of storing the program. For example, the medium can comprise a storage means, such as a ROM, for example a CD ROM or a microelectronic circuit ROM, a flash memory, or else a magnetic recording means, for example a diskette or a hard disk.

Moreover, the information medium can be a transmissible medium such as an electrical or optical signal, which can be conveyed via an electrical or optical cable, by radio or by other means. The program according to the invention can in particular be downloaded from a network of Internet type.

Alternatively, the information medium can be an integrated circuit in which the program is incorporated, the circuit being adapted to execute or to be used in the execution of the method in question.

The various aforementioned modes or characteristics of embodiment can be added independently or in combination with one another, to the steps of the notification method.

LIST OF FIGURES

Figure 2:
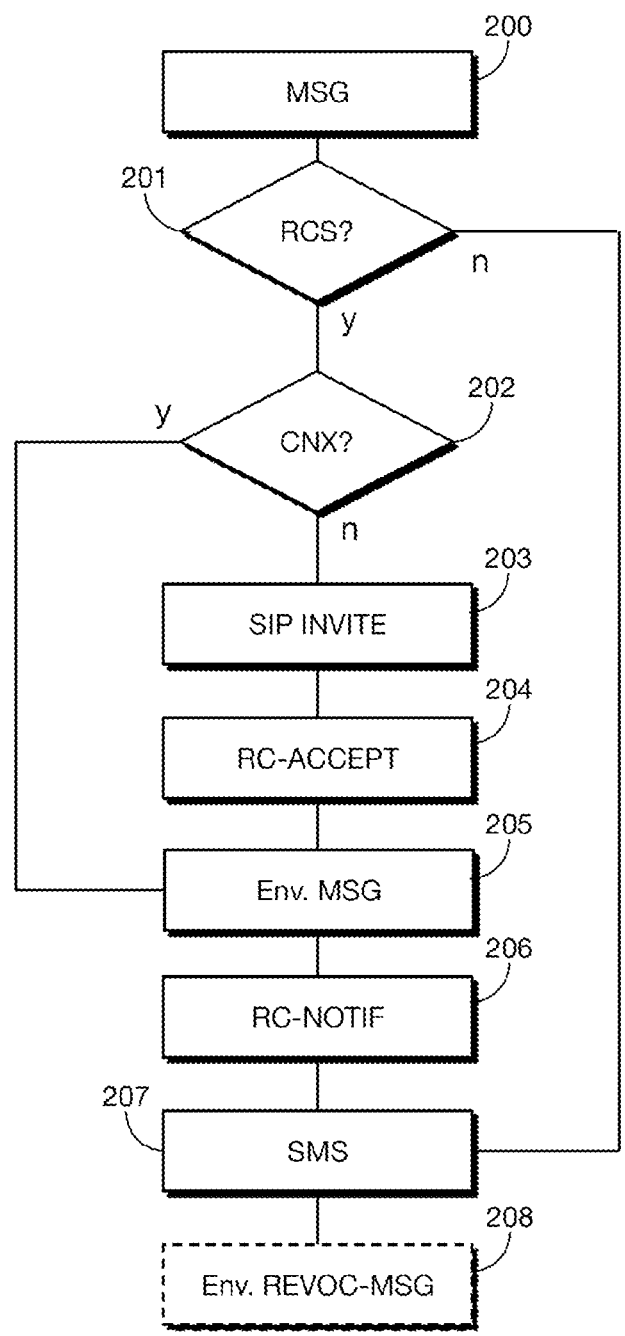
Figure 3:
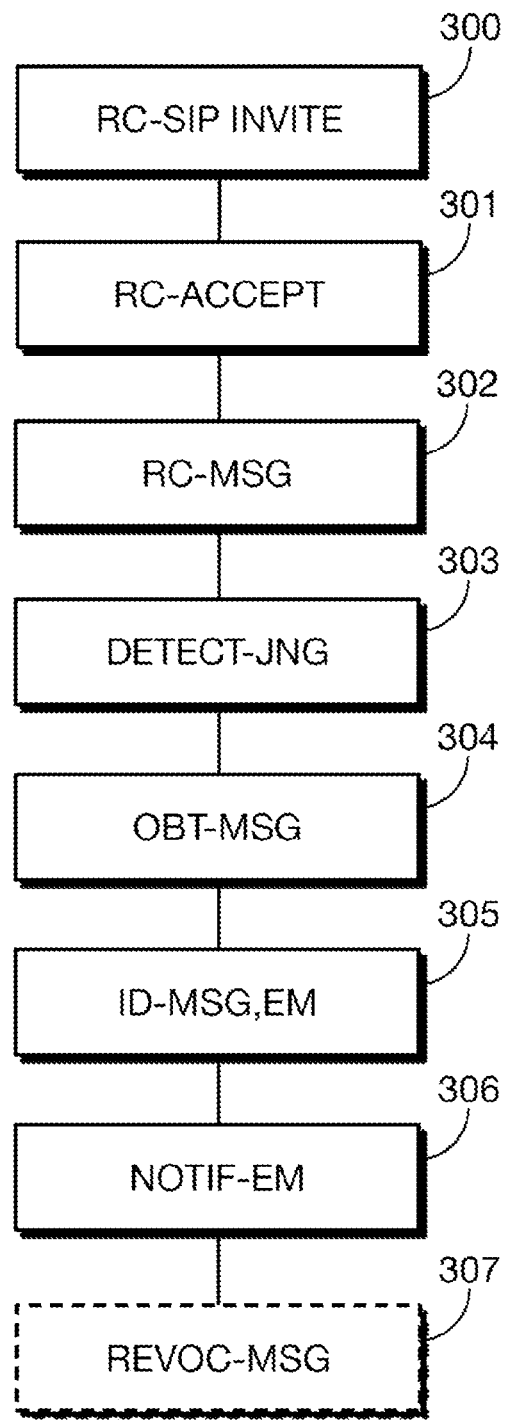
Figure 4:
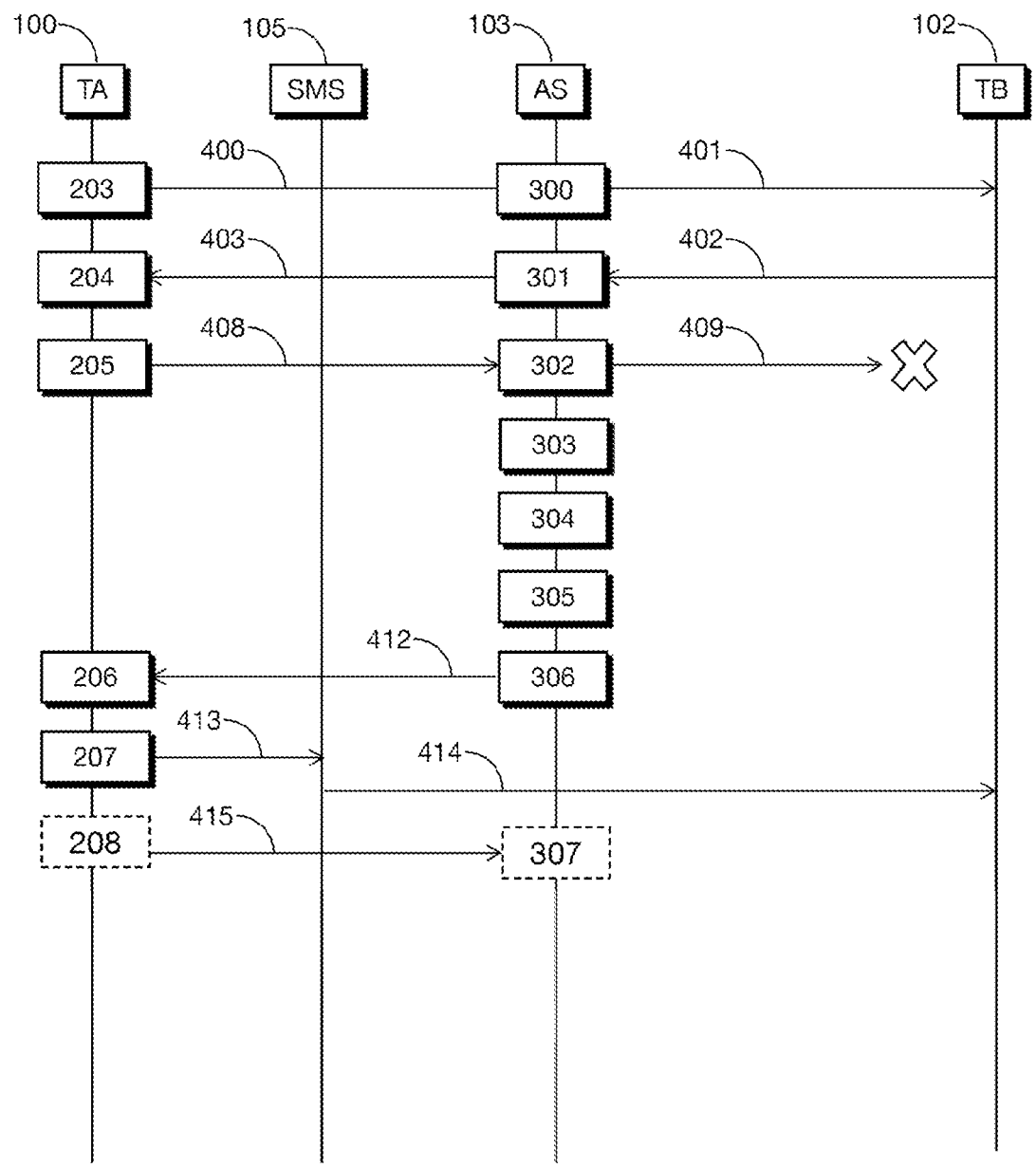
Figure 5:
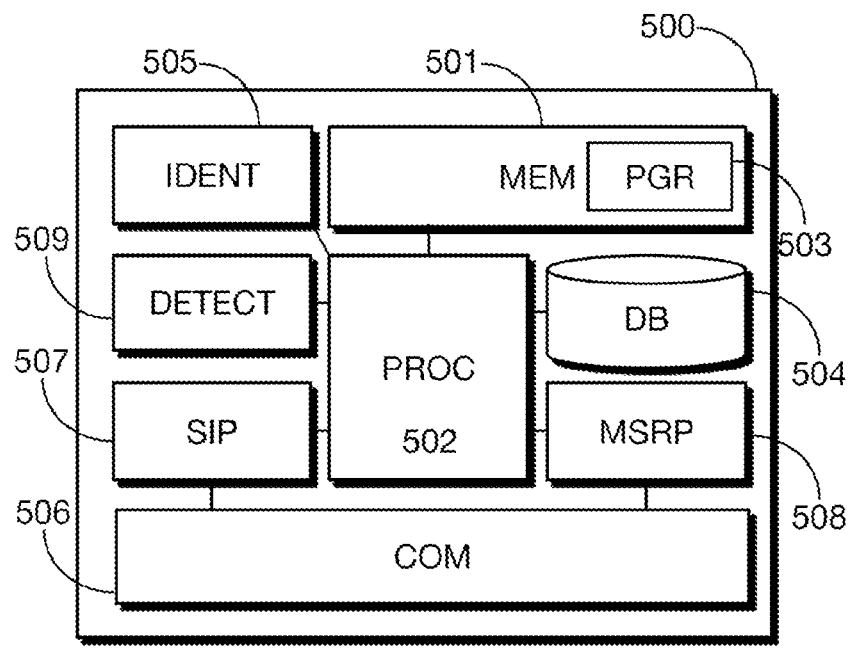
Figure 6:
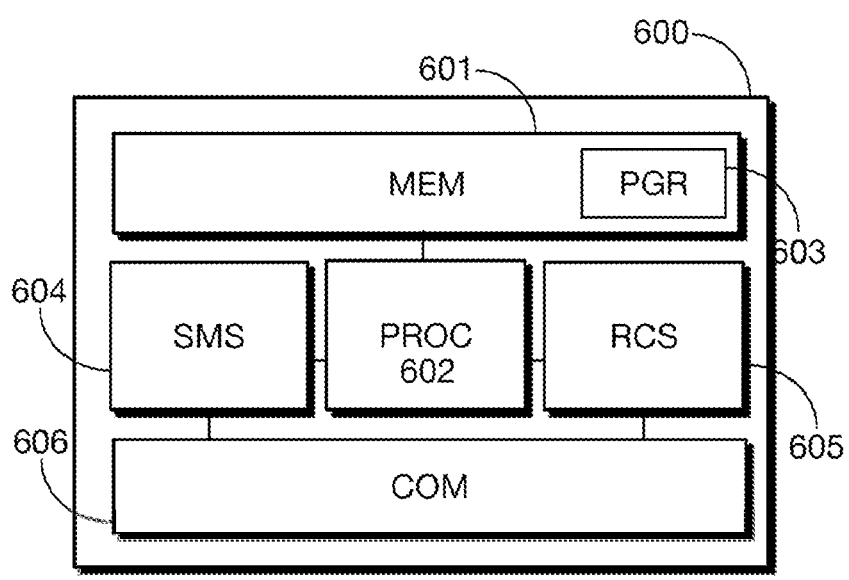

Other characteristics and advantages will become apparent on reading preferred embodiments described with reference to the figures among which:

FIG. 1 illustrates an architecture adapted to implement the method according to a particular embodiment of the invention, FIG. 2 illustrates the main steps of the retransmission method according to a particular embodiment, FIG. 3 illustrates the main steps of the notification method according to a particular embodiment, FIG. 4 represents exchanges of messages between various entities of the architecture, according to a particular embodiment, FIG. 5 represents an architecture of a device adapted to implement the notification method according to a particular embodiment of the invention, and FIG. 6 represents an architecture of a device adapted to implement the retransmission method according to a particular embodiment of the invention.

DETAILED DESCRIPTION OF THE INVENTION

FIG. 1 represents a communication network 101 comprising an application server 103. The network 101 is for example a network of IMS (Internet Multimedia Subsystem) type offering communication services such as for example a communication service according to the RCS (Rich Communication Suite) standard, but the invention can find applications in other types of network. The IMS network 101 comprises an application server 103 implementing a communication service of instant messaging type in compliance with the RCS standard.

The application server 103 comprises a processor, a memory such as for example a RAM (Random Access Memory) memory and a communication interface such as for example an Ethernet network interface. The processor is adapted to execute the instructions of a computer program loaded into the memory. The communication interface allows the application server to exchange data with other equipment through the communication network 101 according to various protocols. For example, the server 103 is adapted to exchange messages in compliance with the SIP (Session Initiation Protocol) and MSRP (Message Session Relay Protocol) protocols used within the framework of RCS (Rich Communication Suite) for instant messaging. The server 103 can also implement any other instant messaging protocol. Such an application server is capable of receiving for example instant messages dispatched from a terminal 100 and of retransmitting these messages to a recipient 102.

The server 103 also comprises a database 104. This database 104 can be integrated into the server or accessible via the communication network. The database allows for example the storage of instant messages awaiting distribution to their recipients and allows in particular the implementation of a service of deferred forwarding of messages of "Store & Forward" type. In a known manner, such a service of deferred forwarding allows temporary storage of messages which cannot be forwarded immediately to their final recipient. For example, if the terminal 102 is not available, the application server 103 can store in the database 104 a message which is intended for the terminal 102. When the terminal 102 is available again, the messages which have been stored are forwarded to it.

The architecture of FIG. 1 also shows two terminals 100 and 102. The terminal 100 is for example a mobile communication terminal of Smartphone type. Such a terminal comprises a processing unit furnished with a processor adapted to execute instructions of a computer program loaded into a memory of the terminal. The terminal 100 also comprises a wireless communication interface.

The terminal 100 is adapted to dispatch and receive messages according to a first mode of communication. For example, the terminal can send and receive messages of SMS or MMS type through an interface for connection to a cellular communication network 105 of GSM, 2G, or else 3G type.

The terminal 100 is furthermore adapted to send and receive messages according to a second mode of communication. For example, the terminal 100 can send and receive messages through a connection to an IMS network 101. The terminal can establish a connection to the network 101 by way of a cellular data interface of Edge, 3G or 4G, type such as for example the network 105, or by way of a wireless network interface of Wifi, Bluetooth or else Wimax type. In this second mode of communication, the messages are for example exchanged according to the RCS (Rich Communication Suite) mobile telephony standard which implements the SIP (Session Initiation Protocol) and MSRP (Message Session Relay Protocol) protocols.

The architecture also comprises a terminal 102 having functionalities substantially equivalent to those of the terminal 100.

Thus, when the user of the terminal 100 wishes to dispatch an instant message to the terminal 102, two modes of dispatch are possible. The message can be dispatched in the form of an SMS by way of the cellular network 105, or else in the form of an instant message by way of the IMS network 101. The second transmission mode, which is in accordance here with the RCS standard, is generally favored since it offers an improved user experience. For example, the user of the terminal 100 benefits from information indicating to him whether the message has indeed been delivered or else whether it has been read by the recipient. Moreover, when the recipient terminal is not reachable, the server 103 can temporarily store the message so as to distribute it on the next connection of the terminal 102.

In order to simplify the user experience and improve the ergonomics of messaging services, operators and constructors propose user interfaces which make it possible to ignore the technology used to transmit the message. It is therefore the terminal which decides, according to the context of use and service rules, whether a message should be sent via SMS or via RCS.

For example, in a conventional manner, when the terminal 100 notes that the recipient terminal 102 does not comply with the RCS standard, the message is automatically dispatched by SMS. Likewise, when messages sent by the terminal 100 are indeed received by the terminal 102, the latter sends an acknowledgment of receipt to the terminal 100. Thus, in the absence of acknowledgment of receipt after the expiry of a timeout, the terminal 100 re-sends the message by SMS.

Of course, such an architecture can comprise other equipment which is not represented here so as to facilitate the understanding of the invention. In particular, the architecture can comprise 2 interconnected IMS networks respectively associated with the terminals 100 and 102. In such a configuration, each IMS network can comprise an application server 103 and a database 104.

A particular mode of the invention will now be described with reference to FIGS. 2, 3 and 4. FIG. 3 illustrates the main steps of the notification method according to a particular embodiment. The steps of the notification method will be described with reference to FIG. 4.

FIG. 2 illustrates the main steps of the retransmission method. These steps can be executed by the terminal 100 when dispatching an instant message to a recipient. An instant message such as this can contain various elements, such as for example text, an image, sound, a video or any other sort of digital content.

In step 200, the user of the terminal composes an instant message by way of a suitable interface of the terminal and confirms dispatch by using a command of a user interface provided for this purpose. For example, the user composes a text message in a screen area provided for this purpose, selects a recipient from a list of contacts and validates the dispatch by touching a validation button on a touch-sensitive interface of the terminal.

The terminal then determines, in step 201, the most suitable mode of dispatch to transmit the message to the recipient by interrogating for example the recipient terminal so as to ascertain the various modes of communication that it supports. According to a particular embodiment, the terminal 100 interrogates a server of the IMS network 101 so as to ascertain the communication capabilities of the remote terminal. Accordingly, the terminal 100 dispatches for example an OPTIONS SIP query and obtains in response the communication capabilities of the recipient terminal. If the recipient terminal does not comply with the RCS standard, the message is transmitted by SMS in step 207. On the other hand, if the response comprises an indication according to which the recipient terminal can communicate in compliance with the RCS standard, the terminal 100 examines in step 202 whether a suitable connection is available to transmit messages to the recipient. If a connection is available, the terminal undertakes the dispatching of the message according to step 205 of the retransmission method. When no connection is available, a connection must be established prior to the dispatching of the message.

The establishment of such a connection comprises in a conventional manner a prior step of registering the terminals on a registration server of the IMS network. Such registration is generally performed by dispatching a REGISTER message in compliance with the SIP protocol. Such a message comprising in particular an identifier of the terminal which is registering and a contact address.

When the two terminals 100 and 102 are correctly registered, an instant messaging session in compliance with the RCS standard can be established. In a known manner, and with reference to FIG. 4, the establishment of the session can be carried out in the following manner:

In step 203, the terminal 100 sends an INVITE SIP message 400 destined for the opposite party. This message is received by the application server 103 in step 300 and then retransmits to the terminal 102 in the form of a message 401.

Subsequent to the receipt of this message, the terminal 102 transmits a response 402 in which it accepts the establishment of the session. This response is received by the application server 103 in step 301 and then retransmitted to the terminal 100 in a message 403.

The terminal 100 can acknowledge receipt of the response 403 by dispatching a message ACK, not represented on the timechart.

This initial message exchange makes it possible to negotiate an instant message exchange protocol. By way of example, this exchange enables the terminal 100 to propose the use of the MSRP protocol to exchange messages. In its response, the terminal 102 can accept the use of the MSRP protocol proposed by the terminal 100. Quite obviously, the invention is not limited to the MSRP protocol alone and various signaling protocols such as H.323 or MGCP, or other message exchange protocols (Jabber/XMPP or SIP/SIMPLE) can be used to implement the invention.

Thus, in step 204, when the terminal 100 receives the response of the terminal 102, the instant messaging session is established and the terminals 100 and 102 can exchange messages through this connection. There therefore exists an SIP signaling session and an MSRP connection for transmitting data established between the terminal 100 and the terminal 102.

Communication networks such as IMS networks implement communication services by way of application servers. Conventionally, a communication established in an IMS network involves one or more of these application servers which may, such as the server 103 of FIGS. 1 and 4, be spliced in for the messages exchanged between the terminals 100 and 102. In this instance, the server 103 is spliced in for the messages exchanged between the terminal 100 and the terminal 102 and provides a service of deferred distribution of messages when the recipient is not reachable. For example, when the terminal 102 does not have network coverage, or when it is not registered on the IMS network, the server 103 can temporarily store in the database 104 the messages which are intended for it so as to forwarded them to it when it becomes available again. Accordingly, the connection established between the terminal 100 and the terminal 102 can correspond to two connections: a first connection between the terminal 100 and the server 103, another connection between the server 103 and the recipient terminal 102. Thus, when the terminal 102 is no longer available, the messages can despite everything be received by the server with a view to deferred distribution.

In step 205, an instant message 408 composed by the user is dispatched in compliance with the MSRP protocol negotiated in the SIP session established in steps 203 and 204. The message is received by the server 103 in step 302 before being retransmitted to the terminal 102. During step 302, the server 103 temporarily stores the message in the database 104 so as to be able to re-send this message later if it cannot be forwarded immediately. Accordingly, the server also stores an identifier of the sender of the message, an identifier of the recipient of the message and an identifier of the message. The storage of the identifier of the sender of the message and the identifier of the message allow the server 103 to notify the sender terminal of the success or failure of forwarding of the message. The storage of the message and of an identifier of the recipient allow the server to attempt transmission of the message to the recipient again. According to a particular embodiment, the storage of the message is carried out solely when the message has not been able to be delivered.

In this example, the message 409 relayed by the server to the recipient cannot be forwarded. For example, the terminal 102 has suddenly become unreachable because its user has moved to an area not covered by the service and the message cannot be forwarded to him.

The server immediately notes that the message has not been able to be forwarded by virtue of a message acknowledgment mechanism provided for by the RCS standard. In step 303, if no confirmation of the forwarding of the message is received by the server, or if the MSRP connection is no longer established between the server 103 and the terminal 102, the server 103, in compliance with the notification method according to the invention, obtains in step 304, the non-forwarded message which was intended for the second terminal. Accordingly, it can consult the database in which the undistributed messages are temporarily stored and obtain a recording comprising the stored data. On the basis of this recording, the server determines, in step 305, an identifier of the message and an identifier of the sender of this message so as to immediately be able to inform the terminal 100 of the non-distribution. In step 306, the server dispatches to the terminal 100, the sender of the message, a notification message 412 comprising at least the identifier of the message which has not been able to be delivered, and an indication according to which the message has not been delivered. Of course, the server 103 may obtain several undistributed messages and the notification message dispatched to the terminal 100 may comprise several identifiers of undelivered messages.

According to a particular embodiment, the notification message 412 is sent according to the SIP protocol. For example, the notification message consists of a message of SIP MESSAGE, SIP INFO or SIP PUBLISH type comprising an indication of non-distribution of the message. The instant message is thus transmitted from the first terminal 100 to the second terminal 102 in a data transfer session in compliance with the MSRP protocol, said session being established according to the SIP signaling protocol, the notification then being transmitted in a message in compliance with the SIP signaling protocol.

According to a particular embodiment, the notification message 412 is sent according to the MSRP protocol. The method profits from an MSRP session being established between the terminal 100 and the server 103 to transmit a notification message to the terminal 100. The instant message is thus transmitted from the first terminal 100 to the second terminal 102 in a data transfer session in compliance with the MSRP protocol, said session being established according to the SIP signaling protocol, the notification then being transmitted in a message in compliance with the MSRP protocol.

According to a particular embodiment, the message non-distribution indication present in the notification message 412 can correspond to a connectivity loss indication whose syntax relies on the CPIM standard defined by the IETF in RFC 3862. According to the invention, the form of such a connectivity loss notification message is given as an example in annex 1. In this example, the invention uses the "NS" header defined in RFC 3862 to notify an event of "neworkEvent" type which relates to loss of connectivity.

On receipt of such a message in step 206, the terminal 100 retransmits the message to the recipient in step 207 according to a second transmission mode. For example, the terminal can retransmit the message in the form of an SMS or of an MMS. Thus, in contradistinction to the prior art, the invention allows greater reactivity when a recipient is no longer available. Indeed, whilst the techniques of the prior art wait for the expiry of a timeout before considering that a message has not been delivered, the invention notifies the sender immediately that the recipient is no longer available.

According to a particular embodiment, the message of notification of a loss of connectivity of a terminal to an instant messaging session is sent to another terminal likewise disconnected from the session without any message having been sent. For example, if a connection is established between the terminals 100 and 102 and if one of the terminals loses its connection, a notification message is dispatched to the other terminal so that the next messages are dispatched by SMS and not RCS. In this case, the notification message does not make reference to any message in particular.

According to a particular embodiment, the server 103 profits from the sending of the previously described network event 412 to inform the terminal 100 of the status of the undelivered messages. Accordingly, the message comprises an identifier of at least one undelivered message.

The message can comprise a content in compliance with the CPIM syntax, such as illustrated as an example in annex 2. Found also in this message is the "NS" header which is used here to define a network event having an impact on messages exchanged. The body of the message comprises information in the XML format relating messages which have not been able to be distributed because of the network event signaled in the "NS" header. In particular, the message comprises a "message-id" field which makes it possible to designate a message, a field relating to the recipient of this message and the message's forwarding status. In this example, the status of the signaled messages is "delivery-failed", thus indicating a failure in forwarding the message to the recipient. As seen in this example, such a notification message can relate to several non-forwarded messages.

The reception of such a notification in step 206 by the terminal 100 enables it at one and the same time to know that the remote terminal is no longer reachable but also that the messages identified in the notification message have not been able to be delivered to the recipient.

Consequently, in step 207 the terminal 100 transmits the undelivered message or messages by using another communication channel, for example by SMS or MMS. Accordingly, the terminal 100 sends a message 413 via the GSM interface of the terminal, the message is relayed by the GSM network before being delivered to the terminal 102 in the form of an SMS 414.

According to a particular embodiment, the terminal 100 can send in step 208 a command 415 for revoking the messages stored temporarily by the server 103. This command can comprise for example identifiers of messages having to be deleted from the database 104. This provision makes it possible advantageously to prevent the messages stored by the server 103 from being forwarded to the terminal 102 when it becomes reachable again. In this way, there no longer exists any message duplication when the that an undelivered and temporarily stored RCS message is re-sent by the application server whilst this same message has been retransmitted by SMS subsequent to the expiry of a timeout on the sender terminal.

In step 307, the server receives the message 415 undertakes the cancellation of the dispatching of at least one message stored in the database 104 with a view to a later retransmission. Accordingly, the server deletes for example from the database 104 the entries which correspond to the message identified in the message 415.

FIG. 5 illustrates the architecture of a device 500 adapted to implement the notification method according to a particular embodiment of the invention.

The device 500 comprises a data processing module comprising a storage space 501, for example a memory (MEM), a processing unit 502, equipped for example with a microprocessor (PROC), and driven by the computer program (PGR) 503 implementing the notification method such as described in the invention in conjunction with FIGS. 3 and 4.

On initialization, the code instructions of the computer program 503 are for example loaded into memory before being executed by the processor of the processing unit 502. The microprocessor of the processing unit 502 implements, according to the instructions of the computer program 503, the steps of the method of notification by an application server, of an inability to deliver a message, and in particular the steps of:
obtaining a message intended for the second terminal,
detecting the fact that the second terminal is not reachable,
determining an identifier of the sender of the message obtained and the identifier of the message obtained,
transmitting to the sender of the message, a notification message comprising at least:
the identifier of the message obtained, and
an indication according to which the message obtained has not been delivered.

According to a particular embodiment, the device comprises means 509 for detecting the fact that the second terminal is unreachable. Such means can comprise a microprocessor, such as for example the processor 502, a memory such as the memory 501 and a computer program comprising instructions adapted to monitor and detect the loss of connection of a terminal. For example, the program can comprise instructions for regularly sending a message to the terminal 102 and determining that the monitored terminal is not available when it does not receive any response. Such a computer program can also comprise instructions for interrogating a registration server of the network in order to ascertain the availability of the monitored terminal.

The device 500 also comprises means 504 for obtaining a message intended for a terminal. This may be for example a relational database, such as the database 104, accepting commands for storing and obtaining data, such as for example SQL commands. The means for obtaining a message can also comprise a microprocessor, such as for example the processor 502, a memory such as the memory 501, and a computer program loaded into this memory comprising instructions adapted to formulate an SQL query adapted to obtain one or more stored messages having a particular terminal as recipient and/or a particular message identifier as identifier. The device can thus obtain all the messages which have not been able to be delivered to a terminal which has been detected as being non-reachable.

The device also comprises means 505 for determining an identifier of the sender of the message obtained and the identifier of the message obtained. These means can comprise a microprocessor, such as for example the processor 502, a memory such as the memory 501, and a computer program loaded into this memory comprising instructions adapted to determine an identifier of the sender of a message, such as for example a telephone number or a URL, as well as an identifier of the message which has been obtained by the obtaining means 504 after having been stored temporarily failing having been able to be delivered. The device can thus generate a notification message comprising identifiers of messages which have not been able to be delivered, and deliver this notification message by using the identifier of the determined sender.

The device furthermore comprises communication means 506 adapted to transmit to the sender of the message, a notification message comprising at least the identifier of the message obtained, and an indication according to which the message obtained has not been delivered. According to a particular embodiment, the notification message comprises an indication according to which the recipient's terminal is not reachable. These communication means are for example implemented by a communication interface such as an Ethernet network interface for example. These communication means can comprise a microprocessor, such as for example the processor 502, a memory such as the memory 501, and a computer program loaded into this memory comprising instructions adapted to generate and dispatch a notification message according to a particular protocol. The device comprises protocol stacks, such as for example SIP protocol stacks 507 and MSRP protocol stacks 508, adapted so as to be able to generate and exchange messages in compliance with the RCS standard.

According to a particular embodiment, the device 500 is included in a server, an application server, an application server of an IMS network.

FIG. 6 illustrates the architecture of a device 600 adapted to implement the retransmission method according to a particular embodiment of the invention.

The device 600 comprises a data processing module comprising a storage space 601, for example a memory (MEM), a processing unit 602, equipped for example with a microprocessor (PROC), and driven by the computer program (PGR) 603 implementing the retransmission method such as described in the invention in conjunction with FIG. 2.

On initialization, the code instructions of the computer program 603 are for example loaded into memory before being executed by the processor of the processing unit 602. The microprocessor of the processing unit 602 implements, according to the instructions of the computer program 603, the steps of the retransmission method, and in particular the steps of:

Dispatching a message to the recipient according to a first transmission mode,
Receiving, from a server, a notification message comprising at least:
 an identifier of a message sent previously, and
 an indication according to which the identified message has not been delivered,
Retransmitting the message to the recipient according to a second transmission mode.

The device furthermore comprises communication means 606 (COM). The communication means comprise a wireless network interface such as for example a Wifi interface and an interface adapted to connect to a cellular network, such as for example a GSM, 3G or 4G interface. The communication means 606 make it possible in particular to dispatch messages by SMS or by RCS, to receive notification messages comprising at least one identifier of a message sent previously, and an indication according to which the identified message has not been delivered. The communication means make it possible also to send commands for revoking messages stored temporarily by the server 103.

Accordingly, the communication means cooperate with protocol modules 604 (SMS) and 605 (RCS) which allow the sending of messages in compliance with the SMS and RCS standards.

The device 600 is integrated with a mobile communication terminal, a terminal of smartphone type, with a tablet or with a personal computer.

---

ANNEX

Annex 1:
 From : Bob <im :bob@example.com>
 To: Alice <im:alice@example.com>
 NS: networkEvent <urn:ietf:params:networkEvent>
 networkEvent.Event-Type: connectivity lost
 Content-length: 0
Annex 2:
 From: Bob <im:bob@example.com>
 To: Alice <im:alice@example.com>
 NS: networkEventandImdn
 <urn:ietf:params:networkEventandImdn>
 networkEventandImdn.Event-Type: connectivity lost
 Content-type: message/imdn+xml
 Content-Disposition: notification
 Content-length: ...
 <?xml version="1.0" encoding="UTF-8"?>
  <networkEventandImdn xmlns="urn:ietf:params:xml:ns:networkEventandImdn">
   <message-id>34jk324j</message-id>
   <datetime>2008-04-04T12:16:49-05:00</datetime>
   <recipient-uri>im:bob@example.com</recipient-uri>
   <original-recipient-uri>im:bob@example.com</original-recipient-uri>
   <delivery-notification>
    <status>
     <deliver-failed/>
    </status>
   </delivery-notification>
   <message-id>424dgfjr256</message-id>
   <datetime>2008-04-04T12:17:02-05:00</datetime>
   <recipient-uri>im:bob@example.com</recipient-uri>
   <original-recipient-uri>im:bob@example.com</original-recipient-uri>
   <delivery-notification>
    <status>
     <deliver-failed/>
    </status>
   </delivery-notification>
 </ networkEventandImdn >

---

Although the present disclosure has been described with reference to one or more examples, workers skilled in the art will recognize that changes may be made in form and detail without departing from the scope of the disclosure and/or the appended claims.

The invention claimed is:

1. A method comprising:
notifying by an application server, an inability to deliver a message sent by a first terminal destined for a second terminal, the message being transmitted from the first terminal in a data transfer session, said data transfer session allowing transfer of data according to a communication protocol, said data transfer session being established according to a signaling protocol and by way of a communication network comprising the application server, wherein the communication protocol is the Message Session Relay Protocol ("MSRP") or Extensible Messaging and Presence Protocol ("XMPP"), said message being in compliance with the communication protocol, wherein notifying comprises:

obtaining the message intended for the second terminal,
detecting that the second terminal is not reachable,
in response to the second terminal being not reachable,
   storing data comprising the message, an identifier of
   the first terminal which sent the message, an identifier
   of the second terminal which is a recipient of the
   message and an identifier of the message,
determining, from the stored data, the identifier of the first
   terminal and the identifier of the obtained message, and
transmitting to the first terminal, in a message in compliance with the signaling protocol, a notification message
   comprising at least:
   the identifier of the obtained message, and
   an indication according to which the obtained message
      has not been delivered,
   provoking retransmission of the obtained message by
      the first terminal via a second transmission mode,
      wherein the second transmission mode is a transmission mode of Short Message Service ("SMS") or a
      transmission mode of Multimedia Messaging Service ("MMS").

2. The method as claimed in claim 1, wherein the method furthermore comprises, subsequent to the transmission of the notification message, receiving a message comprising a command for canceling a dispatching of at least one message obtained and stored with a view to a later retransmission.

3. The method as claimed in claim 1, wherein the notification message comprises an indication relating to a plurality of stored messages which are intended for the second terminal.

4. The method as claimed in claim 1, wherein the signaling protocol is the Session Initiation Protocol ("SIP") or H.323 protocol or Media Gateway Control Protocol ("MGCP").

5. A device for notifying an inability to deliver a message sent by a first terminal destined for a second terminal, the message being transmitted from the first terminal in a data transfer session, said data transfer session allowing transfer of data according to a communication protocol, said data transfer session being established according to a signaling protocol and by way of a communication network comprising the device, wherein the communication protocol is the Message Session Relay Protocol ("MSRP") or Extensible Messaging and Presence Protocol ("XMPP"), the device comprising:
   a processor; and
   a non-transitory computer-readable medium comprising instructions stored thereon, which when executed by the processor configure the device to perform acts comprising:
   obtaining the message intended for the second terminal,
   detecting that the second terminal is unreachable,
   in response to the second terminal being not reachable,
      storing data comprising the message, an identifier of
      the first terminal which sent the message, an identifier
      of the second terminal which is a recipient of the
      message and an identifier of the message,
   determining, from the stored data, the identifier of the first
      terminal and the identifier of the obtained message,
   transmitting to the first terminal, in a message in compliance with the signaling protocol, a notification message
      comprising at least:
      the identifier of the obtained message, and
      an indication according to which the obtained message
         has not been delivered,
      provoking retransmission of the obtained message by
         the first terminal via a second transmission mode,
         wherein the second transmission mode is a transmission mode of Short Message Service ("SMS") or a
         transmission mode of Multimedia Messaging Service ("MMS").

6. The device according to claim 5, wherein the device is an application server.

7. A method comprising:
retransmission on a terminal, of a message sent according to a first transmission mode adapted to transmit the message to a recipient in a data transfer session, said data transfer session allowing transfer of data according to a communication protocol, said data transfer session being established according to a signaling protocol and by way of a communication network comprising an application server, wherein the communication protocol is the Message Session Relay Protocol ("MSRP") or Extensible Messaging and Presence Protocol ("XMPP"), the application server being configured to store at least one message with a view to a later retransmission when the recipient is not reachable, the retransmission comprising:
dispatching the message to the recipient according to the first transmission mode,
receiving, from the application server, a notification message in compliance with the signaling protocol and comprising at least:
   an identifier of the message sent previously by the terminal, and
   an indication according to which the message previously sent by the terminal has not been delivered,
   retransmitting the message to the recipient according to a second transmission mode, wherein the second transmission mode is a transmission mode of Short Message Service ("SMS") type or Multimedia Messaging Service ("MMS") type.

8. The method as claimed in claim 7, further comprising sending to the application server a command for canceling dispatching to the recipient of the message identified in the received notification message.

9. A device for retransmitting a message sent according to a first transmission mode adapted to transmit the message to a recipient in a data transfer session, said data transfer session allowing transfer of data according to a communication protocol, said data transfer session being established according to a signaling protocol and by way of a communication network comprising an application server, wherein the communication protocol is the Message Session Relay Protocol ("MSRP") or Extensible Messaging and Presence Protocol ("XMPP"), the application server configured to store at least one message with a view to a later retransmission when the recipient is not reachable, the device comprising:
   a processor; and
   a non-transitory computer-readable medium comprising instructions stored thereon, which when executed by the processor configure the device to perform acts comprising:
   sending the message to the recipient according to the first transmission mode,
   receiving, from the application server, a notification message in compliance with the second signaling protocol and comprising at least:
      an identifier of the message sent previously by the device, and an indication according to which the message previously sent by the device has not been delivered,
retransmitting the message to the recipient according to a second transmission mode, wherein the second transmission mode is a transmission mode of Short Message Service ("SMS") type or Multimedia Messaging Service ("MMS") type.

10. The device according to claim 9, wherein the device is a communication terminal.

\* \* \* \* \*